US012624569B2

(12) United States Patent
O'Rourke et al.

(10) Patent No.: US 12,624,569 B2
(45) Date of Patent: May 12, 2026

(54) LOCKING ENCLOSURE

(71) Applicant: MASTER LOCK COMPANY LLC, Oak Creek, WI (US)

(72) Inventors: Cornelius Robert O'Rourke, Brookfield, WI (US); Eric Douglas Sanford, Milwaukee, WI (US); Andrew David Bartel, Franklin, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 18/700,732

(22) PCT Filed: Oct. 11, 2022

(86) PCT No.: PCT/US2022/046242
§ 371 (c)(1),
(2) Date: Apr. 12, 2024

(87) PCT Pub. No.: WO2023/064249
PCT Pub. Date: Apr. 20, 2023

(65) Prior Publication Data

US 2025/0237088 A1 Jul. 24, 2025

Related U.S. Application Data

(60) Provisional application No. 63/255,675, filed on Oct. 14, 2021.

(51) Int. Cl.

| | |
|---|---|
| ***E05B 19/00*** | (2006.01) |
| ***E05B 37/00*** | (2006.01) |
| ***E05B 37/02*** | (2006.01) |

(52) U.S. Cl.
CPC ...... *E05B 19/0005* (2013.01); *E05B 37/0048* (2013.01); *E05B 37/02* (2013.01)

(58) Field of Classification Search
CPC .. E05B 19/0005; E05B 37/0048; E05B 37/02; Y10T 70/5009; Y10T 70/50
(Continued)

(56) References Cited

U.S. PATENT DOCUMENTS

| | | | | |
|---|---|---|---|---|
| 2,664,738 A | | 1/1954 | Faganini | |
| 4,532,783 A | * | 8/1985 | Maurice | E05B 19/0005 70/162 |

(Continued)

OTHER PUBLICATIONS

International Search Report from PCT/US2022/046242 dated Feb. 20, 2023.

*Primary Examiner* — Suzanne L Barrett
(74) *Attorney, Agent, or Firm* — Calfee, Halter & Griswold LLP

(57) ABSTRACT

A lockable enclosure includes a housing, a locking mechanism, and an access door assembled with the housing and movable between a closed position and an open position. When the access door is in the closed position, at least one latch member is movable between an interlocking position in interlocking engagement with a staple portion at a location spaced apart from adjoining perimeter edges of the housing and the access door, and a releasing position disengaged from the staple portion to permit movement of the access door from the closed position to the open position. The locking mechanism is operable between a locking condition in which the at least one latch member is secured in the interlocking position, and an unlocked condition in which the at least one latch member is movable to the releasing position.

20 Claims, 13 Drawing Sheets

(58) Field of Classification Search
USPC .............................................................. 70/58
See application file for complete search history.

(56) References Cited

U.S. PATENT DOCUMENTS

| | | | | | |
|---|---|---|---|---|---|
| 4,838,052 | A | * | 6/1989 | Williams | E05B 63/248<br>70/277 |
| 8,375,751 | B2 | | 2/2013 | Hacker | |
| 10,648,196 | B2 | | 5/2020 | Neau | |
| 2005/0235705 | A1 | | 10/2005 | Ling | |
| 2011/0100074 | A1 | | 5/2011 | Meekma | |
| 2016/0108644 | A1 | | 4/2016 | Yutaka | |
| 2017/0234038 | A1 | | 8/2017 | Sanford | |
| 2019/0234113 | A1 | * | 8/2019 | Neau | E05B 17/002 |

* cited by examiner

LOCKING ENCLOSURE

CROSS-REFERENCE TO RELATED APPLICATION

This application claims priority to and all benefit of U.S. Provisional Patent Application Ser. No. 63/255,675, filed on Oct. 14, 2021, entitled LOCKING ENCLOSURE, the entire disclosures of which is incorporated herein by reference.

BACKGROUND

Mountable locking enclosures are used in commercial, residential, and institutional environments to provide lockable access to personal items and/or enclosures. The locking enclosure may include any of a variety of integrated locking mechanisms, including mechanical (e.g., combination dial, pushbutton, key cylinder operated) or electronic (keypad, wireless transceiver, biometric operated) locking arrangements

SUMMARY

In an exemplary embodiment of the present disclosure, a lockable enclosure includes a housing, a locking mechanism, and an access door assembled with the housing and movable between a closed position in which a perimeter edge portion of the access door adjoins a perimeter edge portion of the housing to block access to a cavity defined by the housing and the access door, and an open position permitting access to the cavity. A staple portion is carried by one of the access door and the housing, spaced apart from the perimeter edge portion of the one of the access door and the housing, and at least one latch member is assembled with the other of the access door and the housing, spaced apart from the perimeter edge portion of the other of the access door and the housing. When the access door is in the closed position, the at least one latch member is movable between an interlocking position in interlocking engagement with the staple portion and a releasing position disengaged from the staple portion to permit movement of the access door from the closed position to the open position. The locking mechanism includes a blocking element and a lock interface operable to move the blocking element from a locking position in which the blocking element engages the at least one latch member to prevent movement of the at least one latch member to the releasing position, to an unlocked position in which the blocking element is disengaged from the at least one latch member to permit movement of the at least one latch member to the releasing position.

In another exemplary embodiment of the present disclosure, a lockable enclosure includes a housing, a locking mechanism, and an access door assembled with the housing and movable between a closed position in which a perimeter edge portion of the access door adjoins a perimeter edge portion of the housing to block access to a cavity defined by the housing and the access door, and an open position permitting access to the cavity. A staple portion is carried by the access door, spaced apart from the perimeter edge portion of the access door, and at least one latch member is assembled with the housing, spaced apart from the perimeter edge portion of the housing. When the access door is in the closed position, the at least one latch member is movable between an interlocking position in interlocking engagement with the staple portion and a releasing position disengaged from the staple portion to permit movement of the access door from the closed position to the open position. The locking mechanism is operable between a locking condition in which the at least one latch member is secured in the interlocking position, and an unlocked condition in which the at least one latch member is movable to the releasing position. A lock shroud is affixed to the access door and encloses the staple portion. The lock shroud includes an aperture receiving an end portion of the at least one latch member therethrough to enclose the interlocking engagement between the at least one latch member and the staple portion.

In another exemplary embodiment of the present disclosure, a lockable enclosure includes a housing, a locking mechanism, and an access door assembled with the housing and movable between a closed position in which a perimeter edge portion of the access door adjoins a perimeter edge portion of the housing to block access to a cavity defined by the housing and the access door, and an open position permitting access to the cavity. A staple portion is carried by one of the access door and the housing, and at least one latch member is assembled with the other of the access door and the housing. When the access door is in the closed position, the at least one latch member is movable between an interlocking position in interlocking engagement with the staple portion and a releasing position disengaged from the staple portion to permit movement of the access door from the closed position to the open position. The locking mechanism is operable between a locking condition in which the at least one latch member is secured in the interlocking position, and an unlocked condition in which the at least one latch member is movable to the releasing position. The lockable enclosure further includes a shackle having first and second end portions extending through first and second shackle holes in the housing, and a shackle latch mechanism disposed within the housing and releasably engaged with the first and second shackle end portions to secure the shackle with the housing. The shackle latch mechanism includes first and second shackle latches releasably engaged with the first and second shackle end portions, and first and second release levers independently operable for independent disengagement of the first and second shackle latches from the first and second shackle end portions.

BRIEF DESCRIPTION OF THE DRAWINGS

Further features and advantages of the invention will become apparent from the following detailed description made with reference to the accompanying drawings, wherein.

DETAILED DESCRIPTION

Figure 1A:
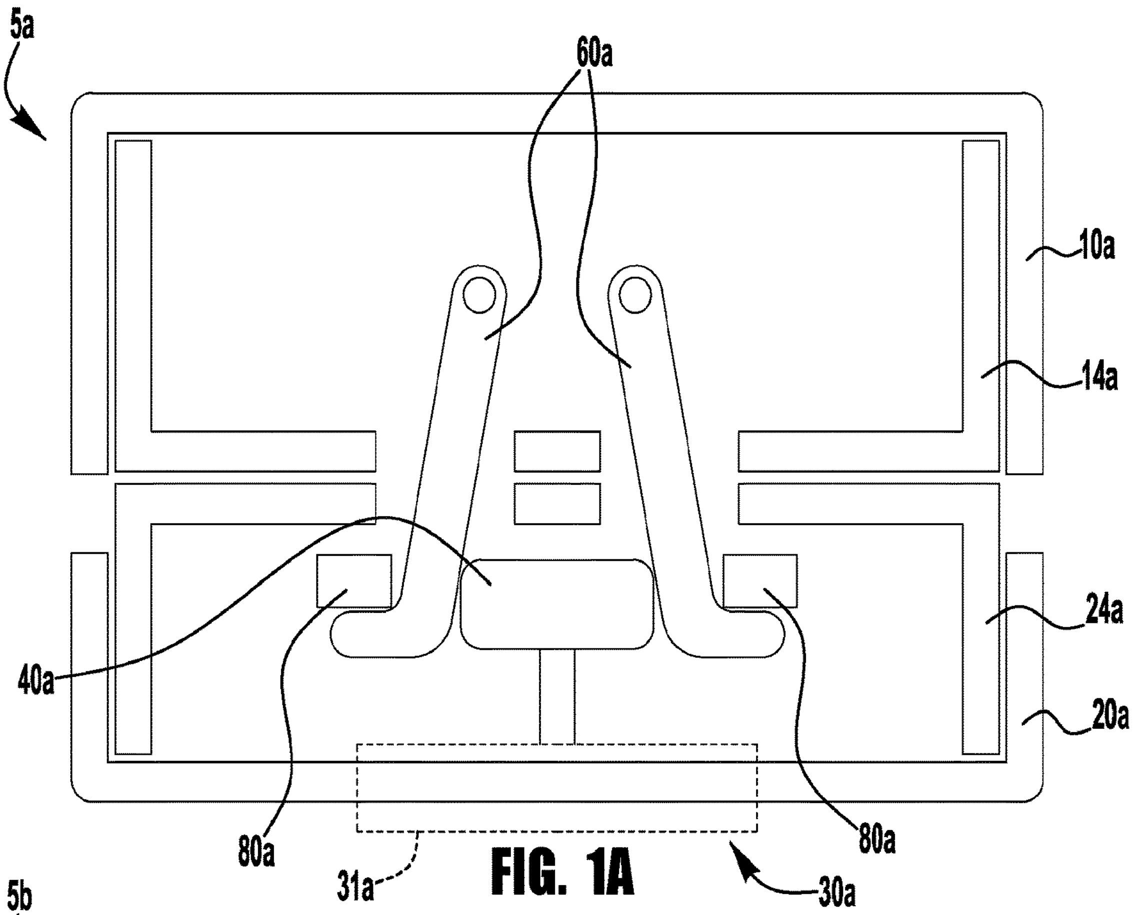
FIG. 1A is a schematic top cross-sectional view of a lockable enclosure including latch members assembled with the enclosure housing, a staple portion carried by the access door, and a locking mechanism assembled with the access door, according to an exemplary embodiment of the present disclosure.

While the embodiments described in the present disclosure refer to a multiple-dial combination key safe or lockbox, the present application relates to combination lock arrangements that may be used with many different types of locks, and to key safes and lockboxes that may be used with many different types of locking mechanisms. For example, the combination lock arrangements described herein may be used with combination padlocks, safe locks, and integral locks for lockers, mailboxes, storage sheds, or other such structures and enclosures. As another example, the key safe or lockbox features described herein may be used with other types of locking enclosures.

This Detailed Description merely describes exemplary embodiments and is not intended to limit the scope of the claims in any way. Indeed, the invention as claimed is broader than and unlimited by the described embodiments, and the terms used in the claims have their full ordinary meaning.

Many conventional key safes or lockboxes include a locking mechanism disposed on one of the access door and the housing, that can be unlocked to allow for movement of one or more latch members out of engagement with an adjoining or abutting edge portion of the other of the access door and the housing to open the access door. According to one aspect of the present application, a lockable enclosure, such as, for example, a key safe, may be provided with a locking mechanism (e.g., a multiple-dial combination locking mechanism, as shown) that blocks or permit movement of one or more latch members out of engagement with a corresponding staple portion disposed within the enclosure, spaced apart and shielded from the adjoining edges of the access door and the housing, for example, to prevent tampering with the latch member(s) or staple portion when the access door is closed and locked. The staple portion may include any structure or structures positioned to interlock with the latch member to prevent movement of the access door from the closed position to the open position when the latch member is secured in this interlocking position, including, for example, pins, rollers, tabs, flanges, cutouts, apertured wall portions, or other such suitable staple elements. While the illustrated embodiments described herein include two latch members, a lockable enclosure as described herein may utilize one latch member or more than two latch members.

Conventional key safes and lock boxes include locking mechanisms that employ a latch or other locking member that extends across adjoining peripheral edge portions of an enclosure and an access door to block movement of the access door from the closed position to the open position. In such assemblies, proper manipulation of a lock interface (e.g., key cylinder lock, combination dial(s), electromechanical keypad) moves (or makes movable) the locking member to retract the locking member from the adjoining peripheral edge portions to allow the access door to be moved to the open position. In many such assemblies, the positioning of the locking member across this seam between the peripheral edge portions of the access door and the enclosure renders the locking member vulnerable to improper manipulation or attack, for example, by insertion of a tool through the peripheral edge seam.

According to an exemplary aspect of the present disclosure, a lockable enclosure may be provided with a locking arrangement that utilizes one or more latch members assembled with one of the enclosure housing and the access door, and one or more latch engageable staple portions carried by the other of the enclosure housing and the access door, at locations spaced apart from the adjoining peripheral edges of the enclosure housing and access door. In such an arrangement, improper access to the latch member(s) and staple(s) portions is impeded, thereby reducing the risk of many forms of unauthorized manipulation or attack of the locked enclosure.

FIGS. 1A-1D schematically illustrate top cross sectional views of various lockable enclosures 5*a*, 5*b*, 5*c*, 5*d* including an enclosure housing 10*a*, 10*b*, 10*c*, 10*d* and an access door 20*a*, 20*b*, 20*c*, 20*d* assembled with the housing, and secured in a closed position by one or more latch members 60*a*, 60*b*, 60*c*, 60*d* held in an interlocking position in interlocking engagement with a staple portion 80*a*, 80*b*, 80*c*, 80*d* by a locking mechanism 30*a*, 30*b*, 30*c*, 30*d*. The locking mechanism includes a blocking element 40*a*, 40*b*, 40*c*, 40*d* that engages the latch member(s) 60*a-d* to prevent disengagement of the latch member(s) from the staple portion 80*a-d*. When a lock interface 31*a*, 31*b*, 31*c*, 31*d* of the locking mechanism 30*a-d* is properly manipulated (e.g., by an authorized key or combination code entry), the blocking element 40*a-d* is moved or movable out of engagement with the latch member(s) 60*a-d* to permit disengagement of the latch member(s) from the staple portion 80*a-d,* for movement of the access door 20*a-d* to the open position. Either or both of the housing 10*a-d* and access door 20*a-d* may be provided with a shroud portion 14*a-d,* 24*a-d* at least partially enclosing the corresponding latch member(s), staple portion, and blocking element, for example, to protect these components from improper manipulation or attack.

In the exemplary embodiment of FIG. 1A, the latch members 60*a* are assembled with the housing 10*a,* the staple portion 80*a* is carried by (e.g., assembled with or integrally formed with) the access door 20*a,* and the locking mechanism 30*a* is assembled with the access door. A housing shroud 14*a* is provided with (e.g., assembled with) the housing 10*a* to enclose base, connected portions of the latch members 60*a,* with end portions of the latch members extending through opening(s) in the housing shroud. A door shroud 24*a* is provided with (e.g., assembled with) the access door 20*a* to enclose the staple portion 80*a* and the blocking element 40*a,* with opening(s) in the door shroud receiving the latch member end portions for interlocking engagement with the staple portion.

Figure 1B:
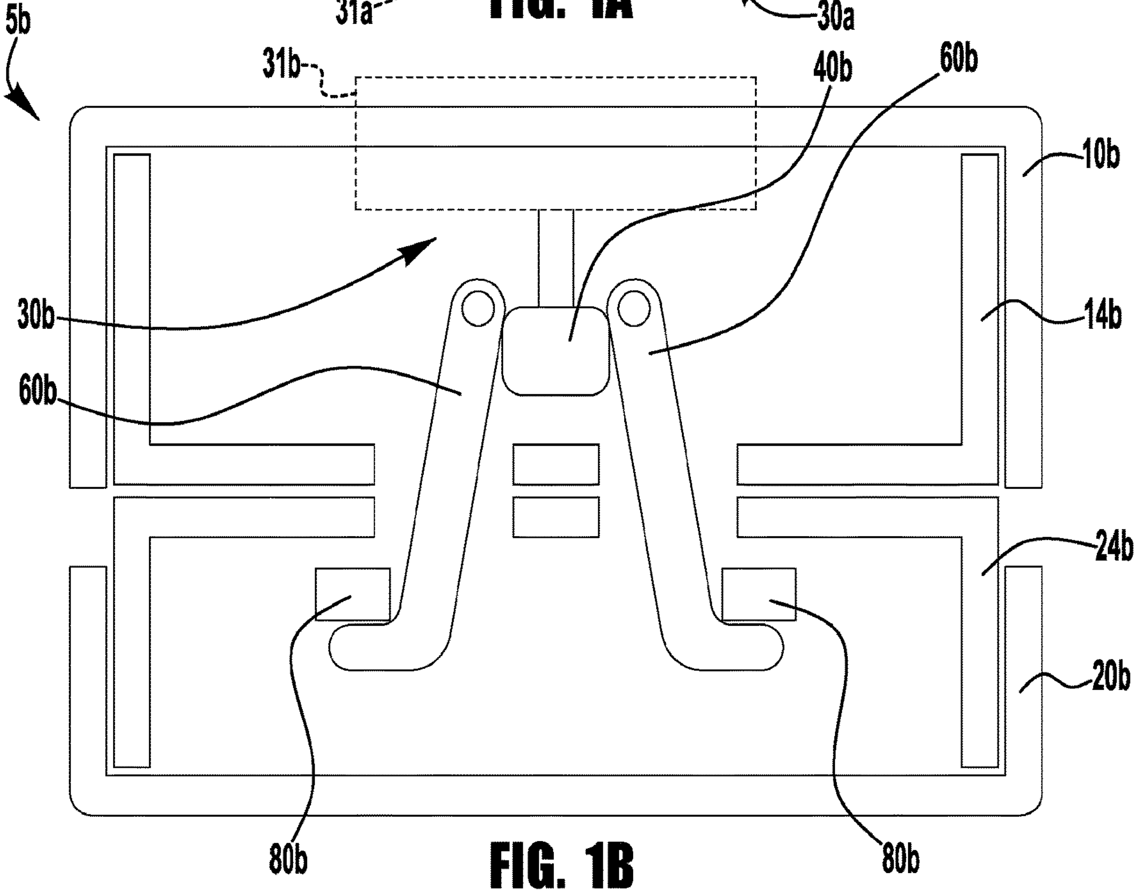
FIG. 1B is a schematic top cross-sectional view of a lockable enclosure including latch members assembled with the enclosure housing, a staple portion carried by the access door, and a locking mechanism assembled with the enclosure housing, according to another exemplary embodiment of the present disclosure.

In the exemplary embodiment of FIG. 1B, the latch members 60*b* are assembled with the housing 10*b,* the staple portion 80*b* is carried by (e.g., assembled with or integrally formed with) the access door 20*b,* and the locking mechanism 30*b* is assembled with the housing. A housing shroud 14*b* is provided with (e.g., assembled with) the housing 10*a* to enclose base, connected portions of the latch members 60*b* and the blocking element 40*b,* with end portions of the latch members extending through opening(s) in the housing shroud. A door shroud 24*b* is provided with (e.g., assembled with) the access door 20*b* to enclose the staple portion 80*b,* with opening(s) in the lock shroud receiving the latch member end portions for interlocking engagement with the staple portion.

Figure 1C:
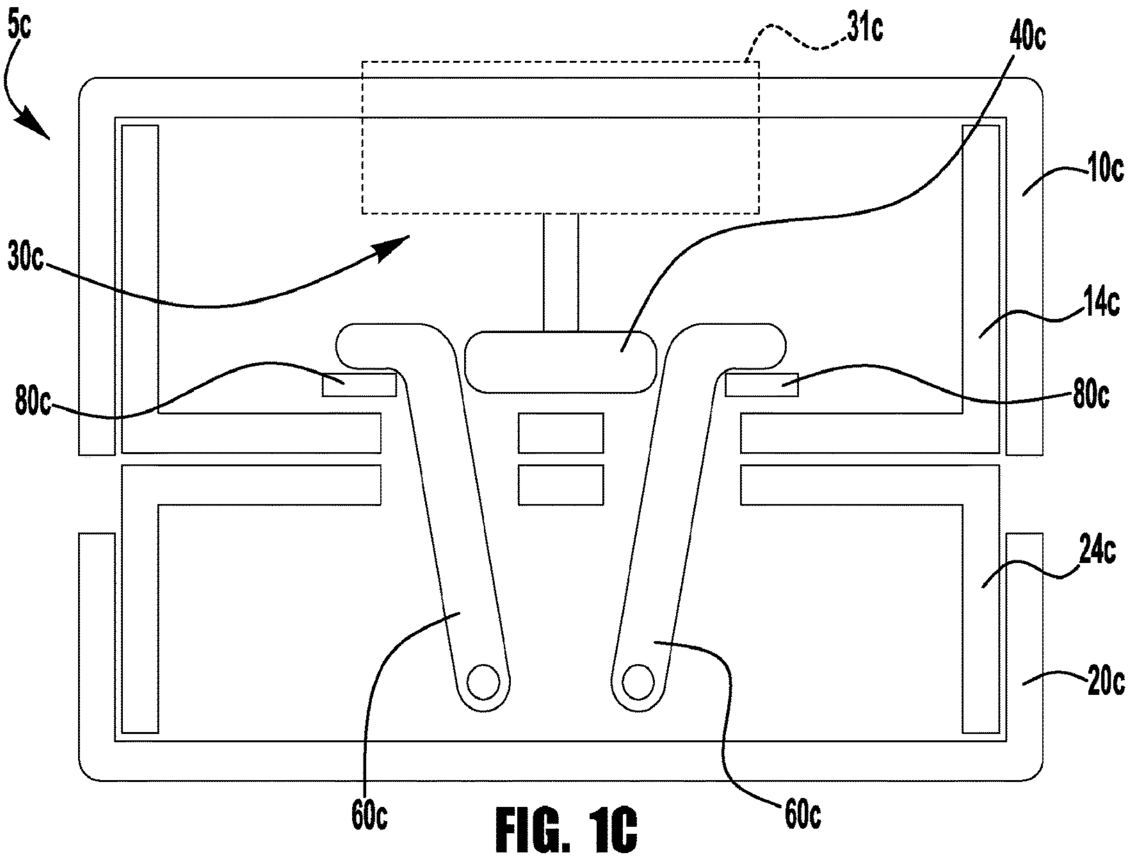
FIG. 1C is a schematic top cross-sectional view of a lockable enclosure including latch members assembled with the access door, a staple portion carried by the enclosure housing, and a locking mechanism assembled with the access door, according to another exemplary embodiment of the present disclosure.

In the exemplary embodiment of FIG. 1C, the latch members 60*c* are assembled with the access door 20*c,* the staple portion 80*c* is carried by (e.g., assembled with or integrally formed with) the housing 10*c,* and the locking mechanism 30*c* is assembled with the housing. A door shroud 24*c* is provided with (e.g., assembled with) the access door 20*c* to enclose base, connected portions of the latch members 60*c,* with end portions of the latch members extending through opening(s) in the door shroud. A housing shroud 14*c* is provided with (e.g., assembled with) the housing 10*c* to enclose the staple portion 80*c* and the blocking element 40*c,* with opening(s) in the housing shroud receiving the latch member end portions for interlocking engagement with the staple portion.

Figure 1D:
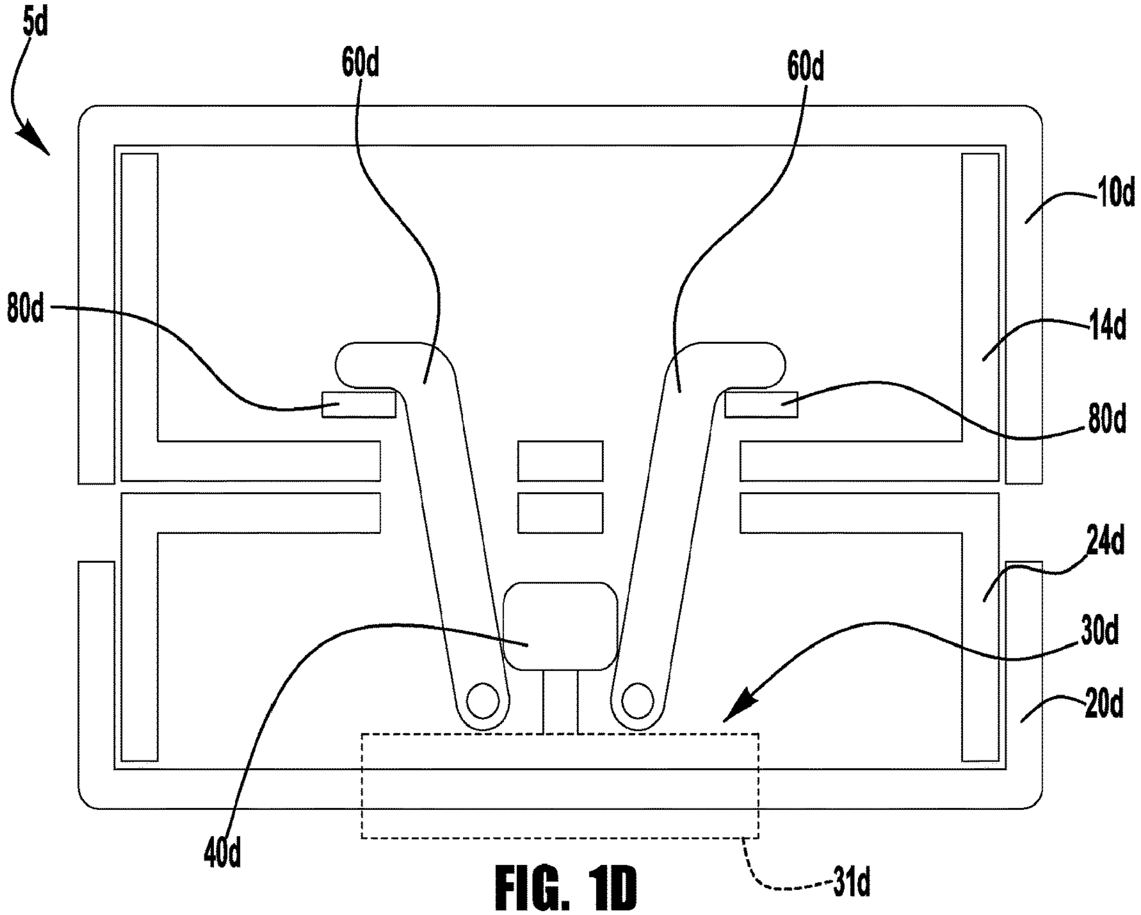
FIG. 1D is a schematic top cross-sectional view of a lockable enclosure including latch members assembled with the access door, a staple portion carried by the enclosure housing, and a locking mechanism assembled with the enclosure housing, according to another exemplary embodiment of the present disclosure.
Figure 2:
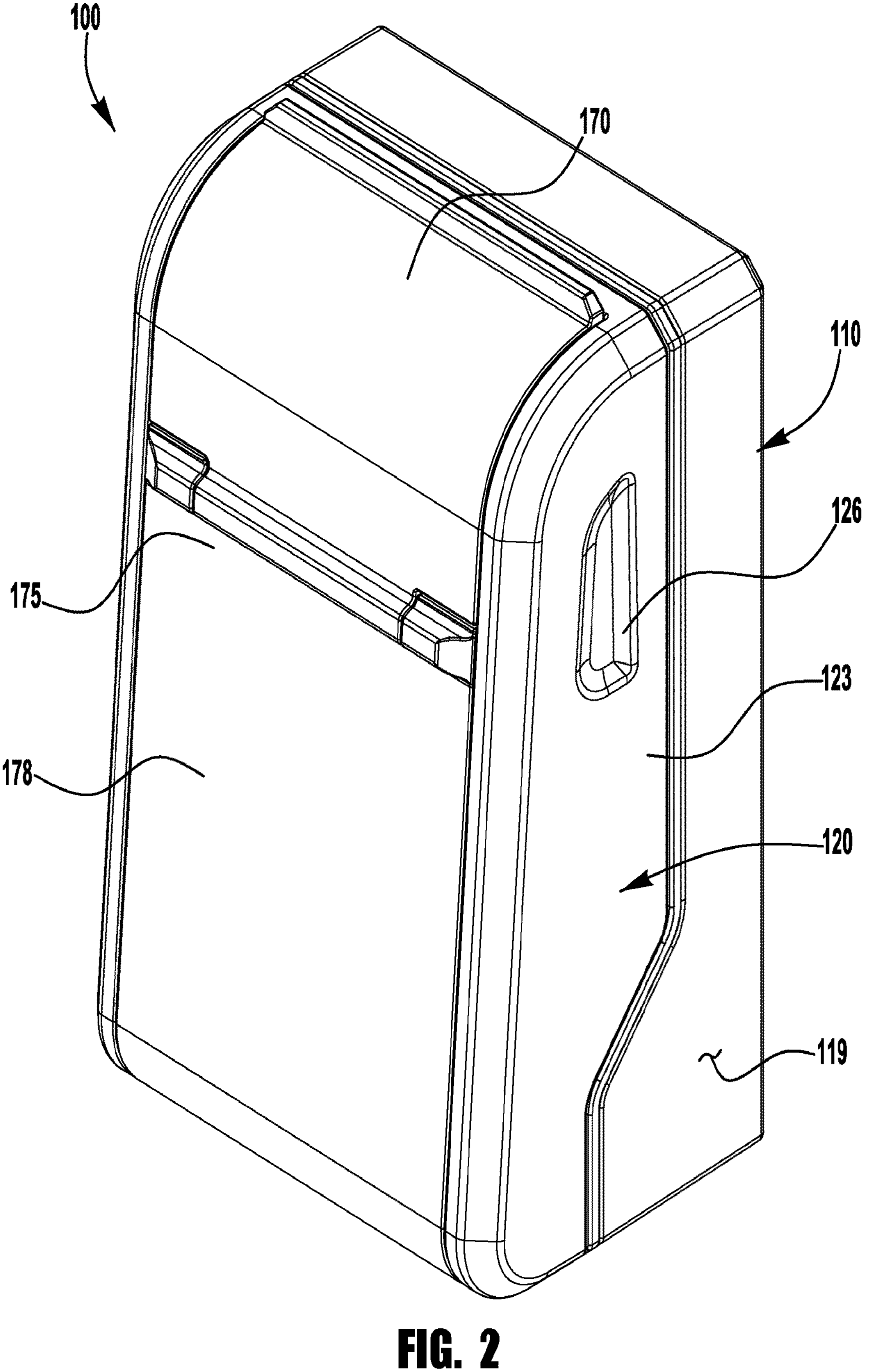
FIG. 2 is a front perspective view a lockbox in accordance with an exemplary embodiment of the present disclosure, shown in a closed condition.
Figure 2A:
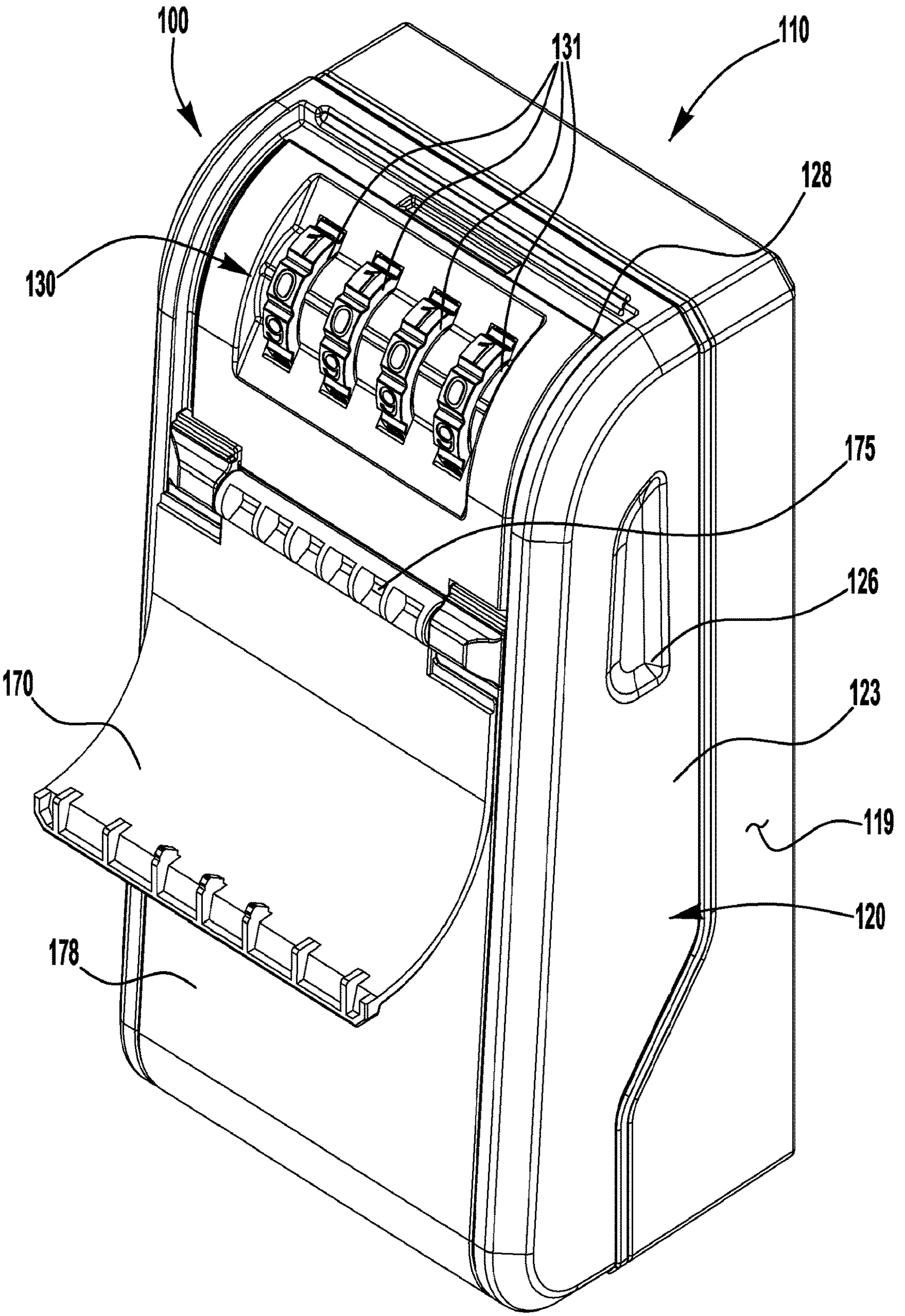
FIG. 2A is a front perspective view of the lockbox of FIG. 2, shown with the cover in an open, dial uncovering position.

In the exemplary embodiment of FIG. 1D, the latch members 60*d* are assembled with the access door 20*d,* the staple portion 80*d* is carried by (e.g., assembled with or integrally formed with) the housing 10*d,* and the locking mechanism 30*d* is assembled with the access door. A door shroud 24*d* is provided with (e.g., assembled with) the access door 20*d* to enclose the blocking element 60*d* and base, connected portions of the latch members 60*d,* with end portions of the latch members extending through opening(s) in the door shroud. A housing shroud 14*d* is provided with (e.g., assembled with) the housing 10*d* to enclose the staple portion 80*d,* with opening(s) in the housing shroud receiving the latch member end portions for interlocking engagement with the staple portion.

Figure 3:
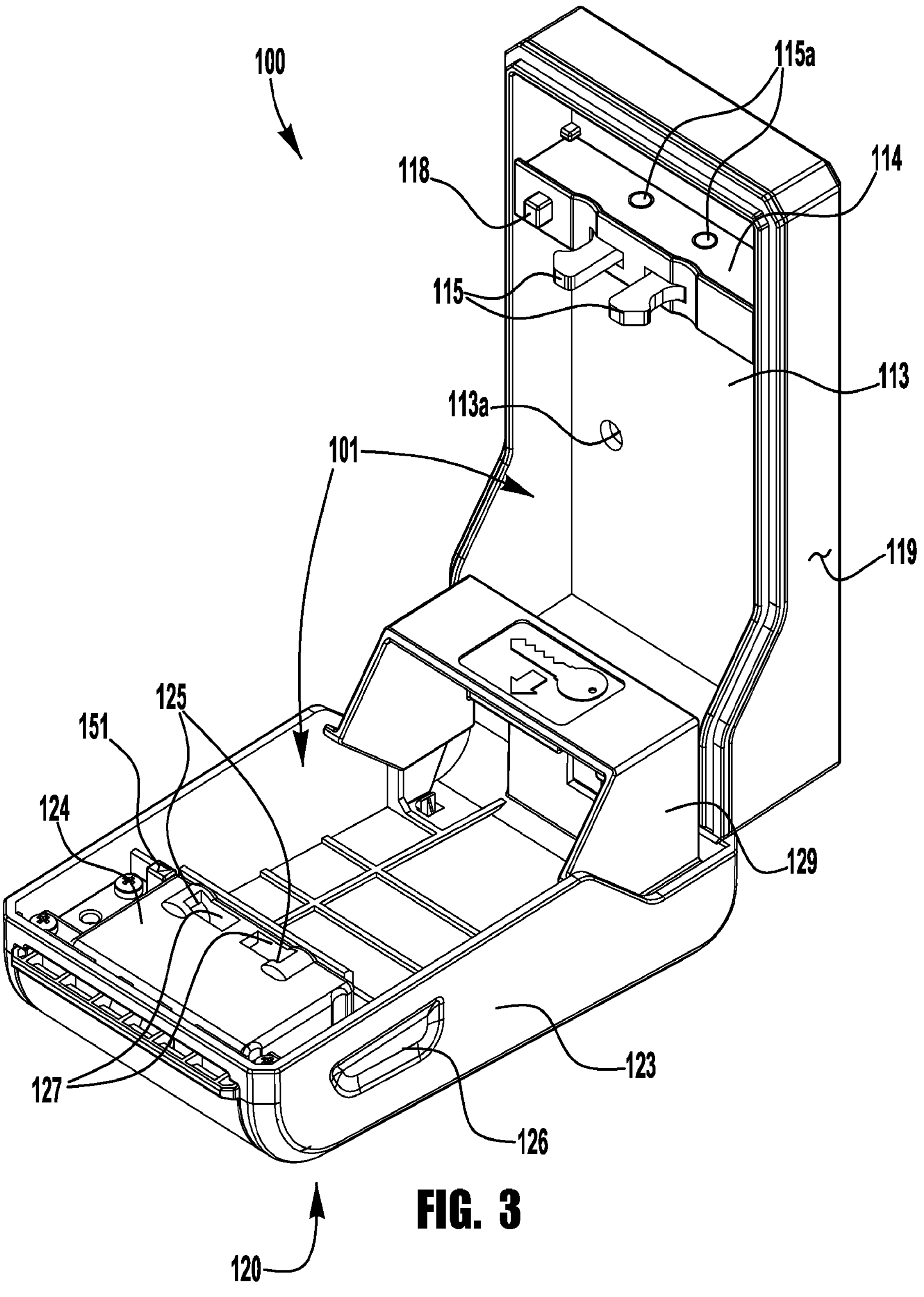
FIG. 3 is a front perspective view of the lockbox of FIG. 2, shown in an open condition.
Figure 4:
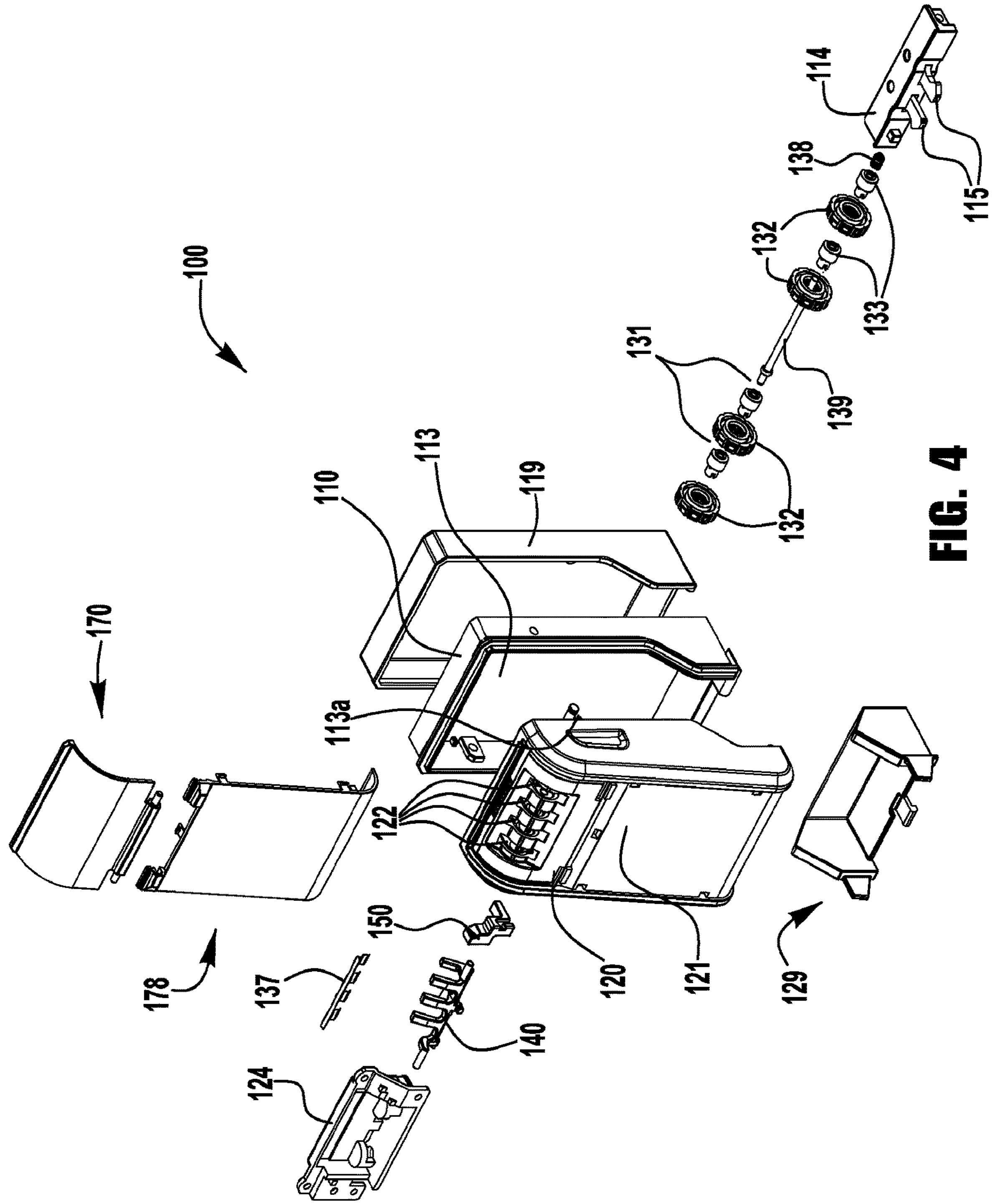
FIG. 4 is an exploded perspective view of the lockbox of FIG. 2.
Figure 5A:
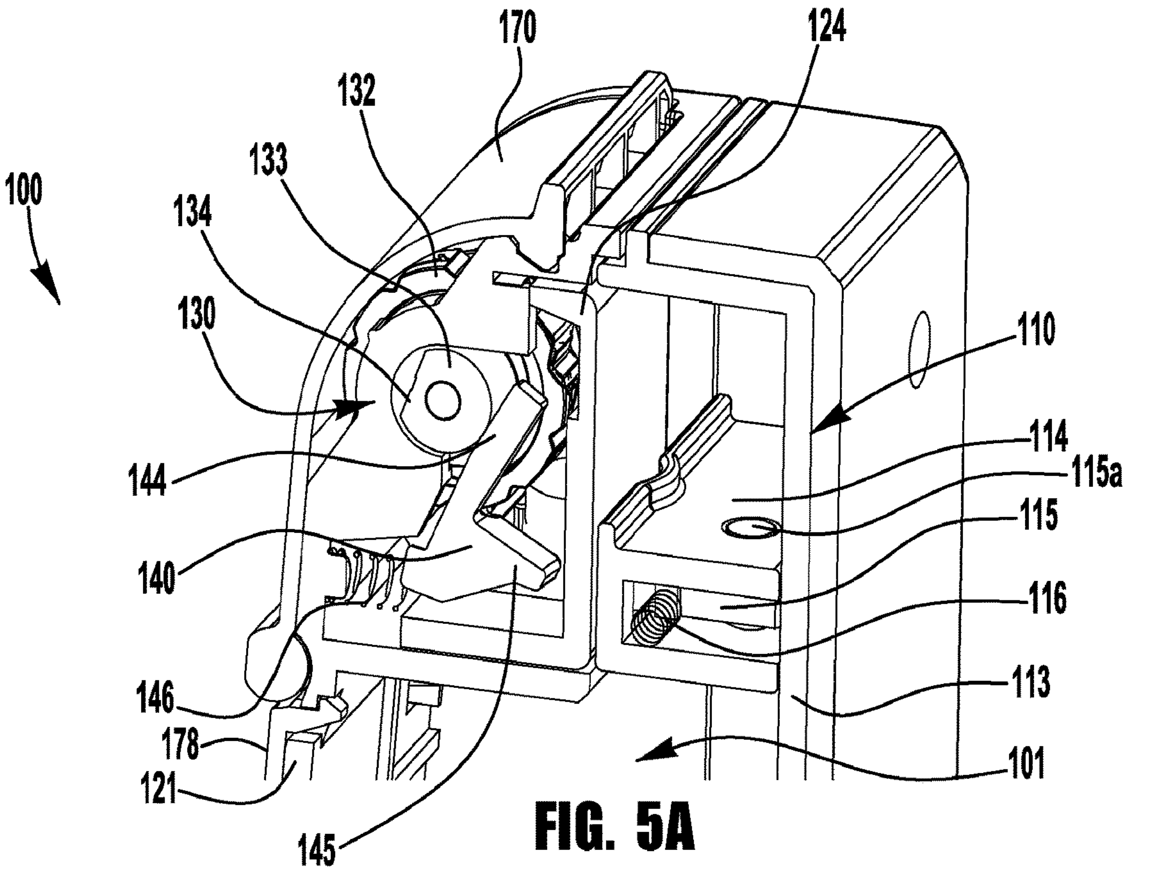
FIG. 5A is an upper side cross-sectional view of the lockbox of FIG. 2, shown with the combination dials in a locked configuration.
Figure 5B:
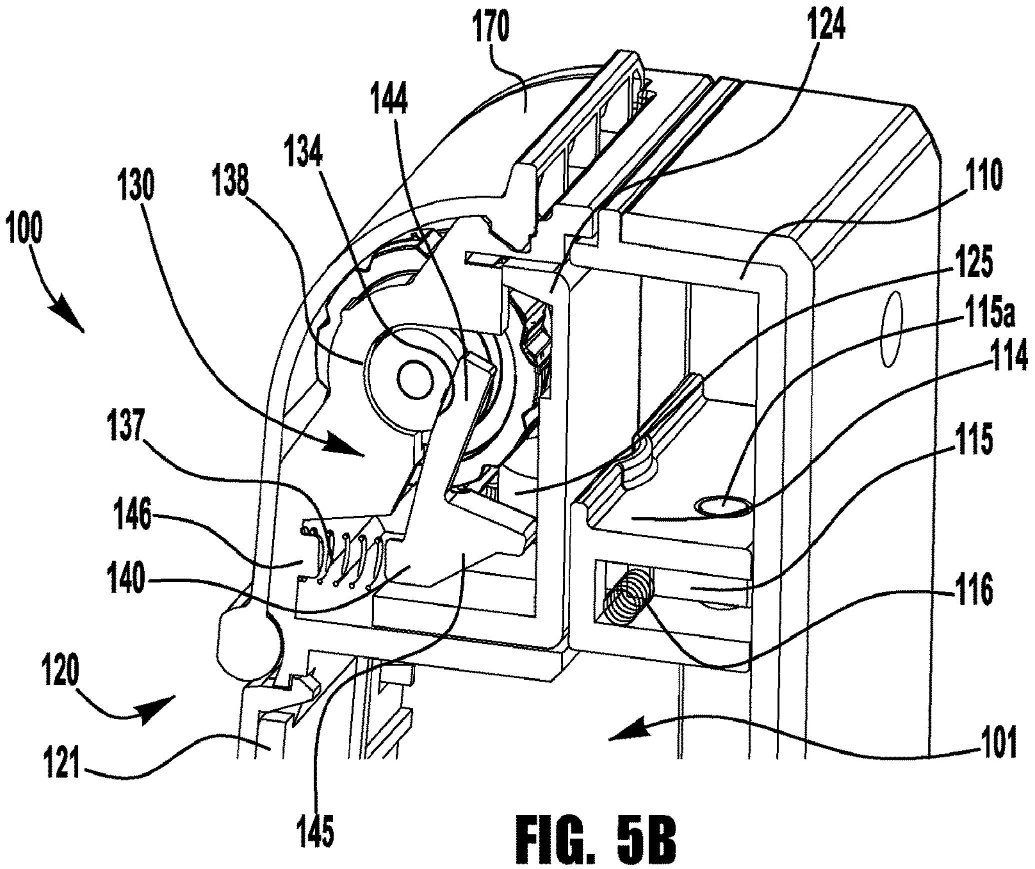
FIG. 5B is an upper side cross-sectional view of the lockbox of FIG. 2, shown with the combination dials in an unlocked configuration.

FIGS. 2-7B illustrate an exemplary embodiment of a key safe or lockbox 100 having a housing 110 and an access door 120 secured with the housing such that outer edge portions of the access door adjoin or abut outer edge portions of the housing when the access door is in a closed position, blocking access to an internal cavity 101 of the lockbox, defined by both the housing and the access door (FIGS. 3, 5A, 5B). In the illustrated embodiment, the access door 120 is pivotably connected with the housing 110 (e.g., by hinge pins, not shown) for hinged movement between closed and open positions. In other embodiments (not shown), the access door may be slideable, removable or otherwise movable between closed and open positions.

Figure 6A:
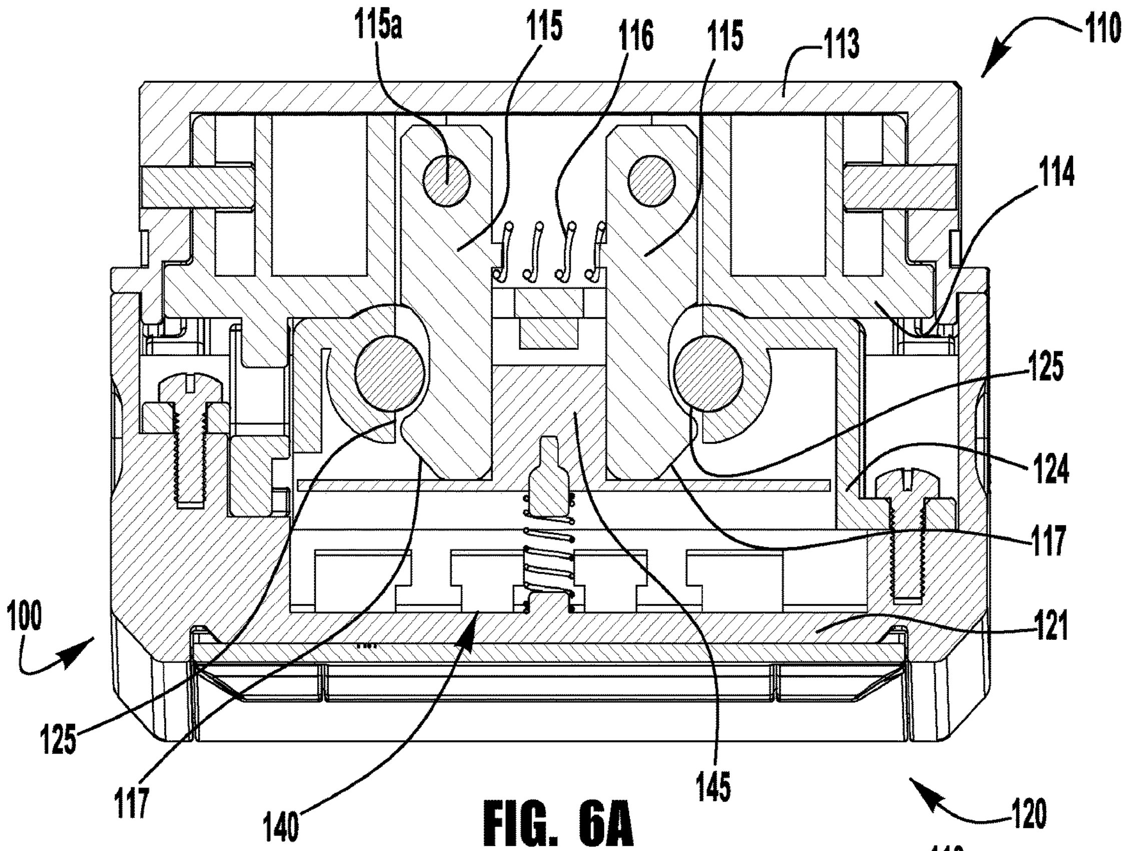
FIG. 6A is a top cross-sectional view of the lockbox of FIG. 2, shown with the blocking element in a locking position.
Figure 6B:
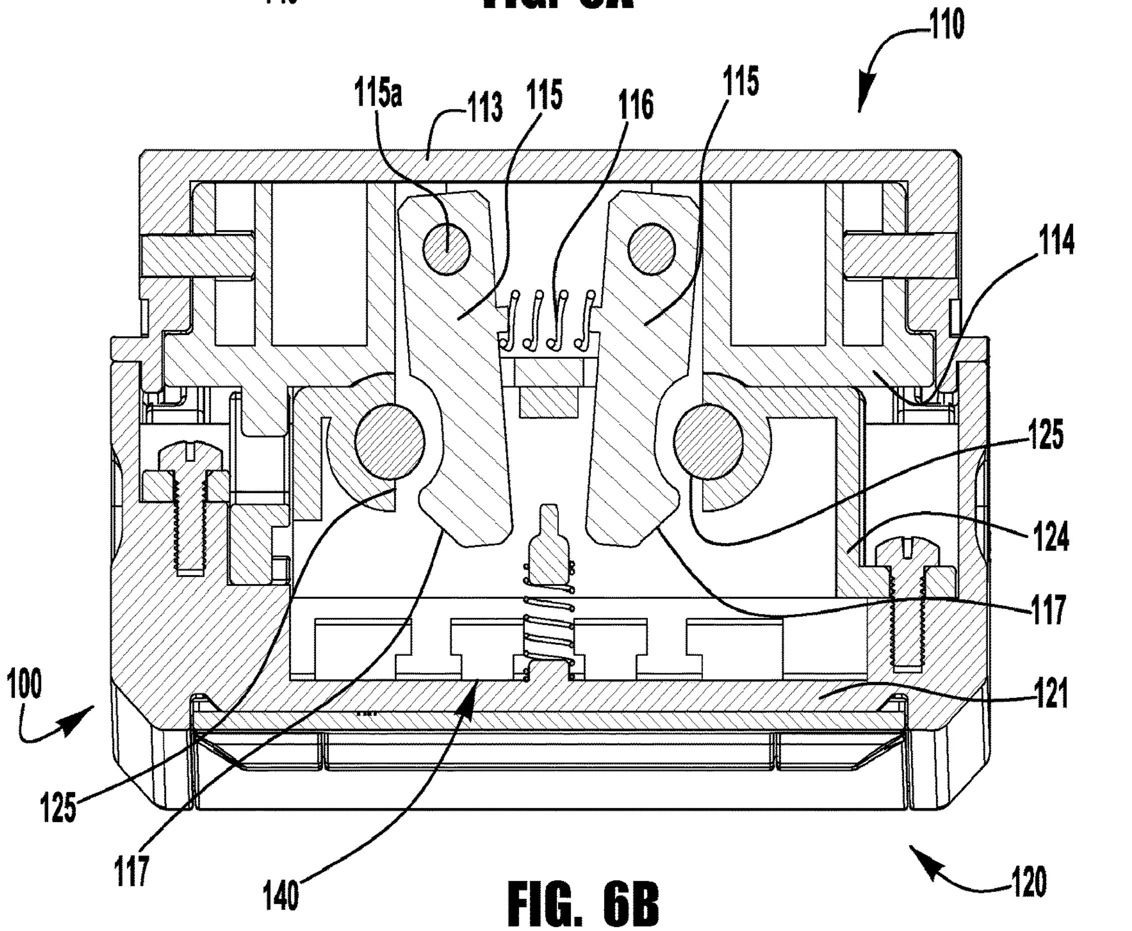
FIG. 6B is a top cross-sectional view of the lockbox of FIG. 2, shown with the blocking element in a releasing position.
Figure 7A:
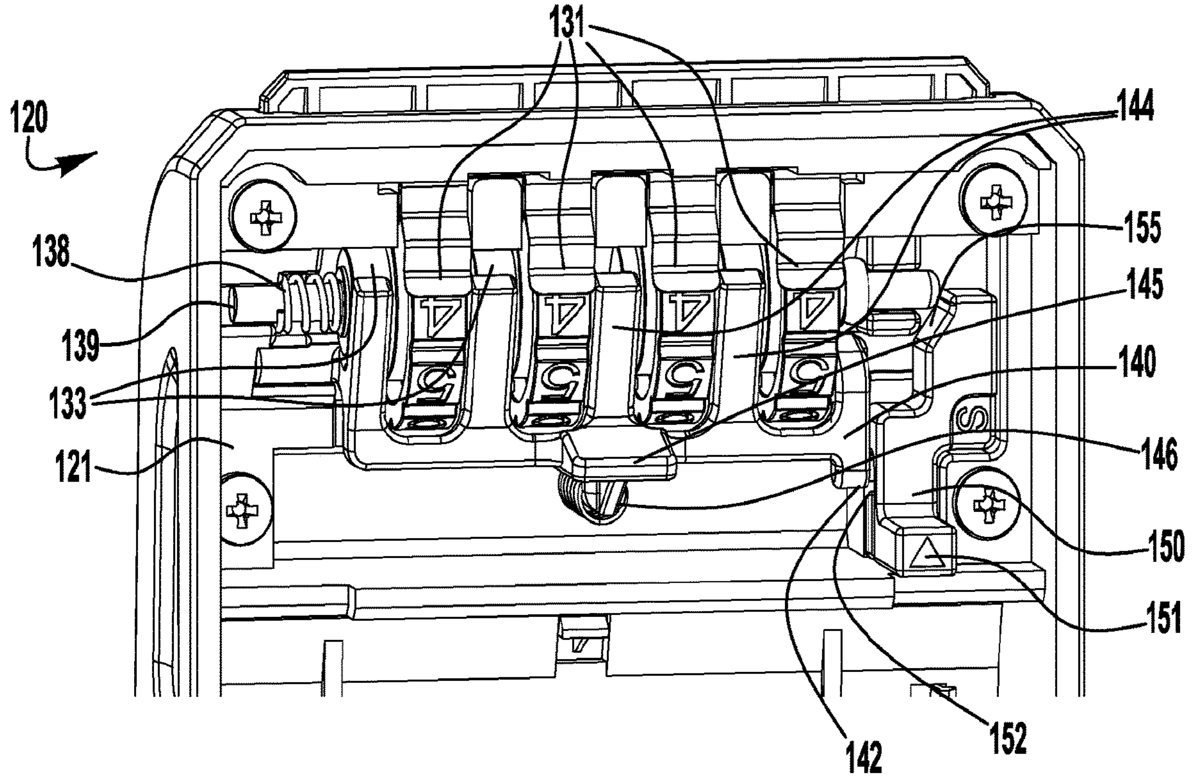
FIG. 7A is a rear perspective view of an upper portion of the access door of the lockbox of FIG. 2, with the lock shroud removed to illustrate additional features of the lockbox, shown in a code maintaining condition.
Figure 7B:
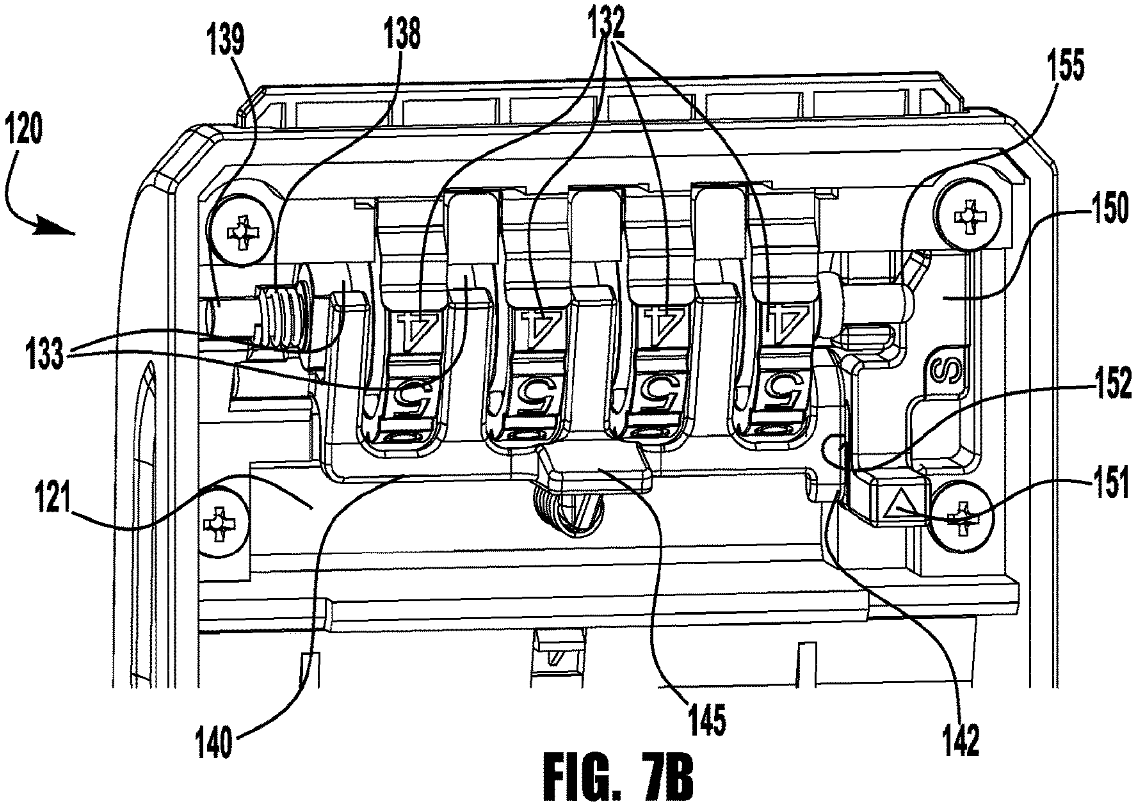
FIG. 7B is a rear perspective view of an upper portion of the access door of the lockbox of FIG. 2, with the lock shroud removed to illustrate additional features of the lockbox, shown in a code change condition.
Figure 8:
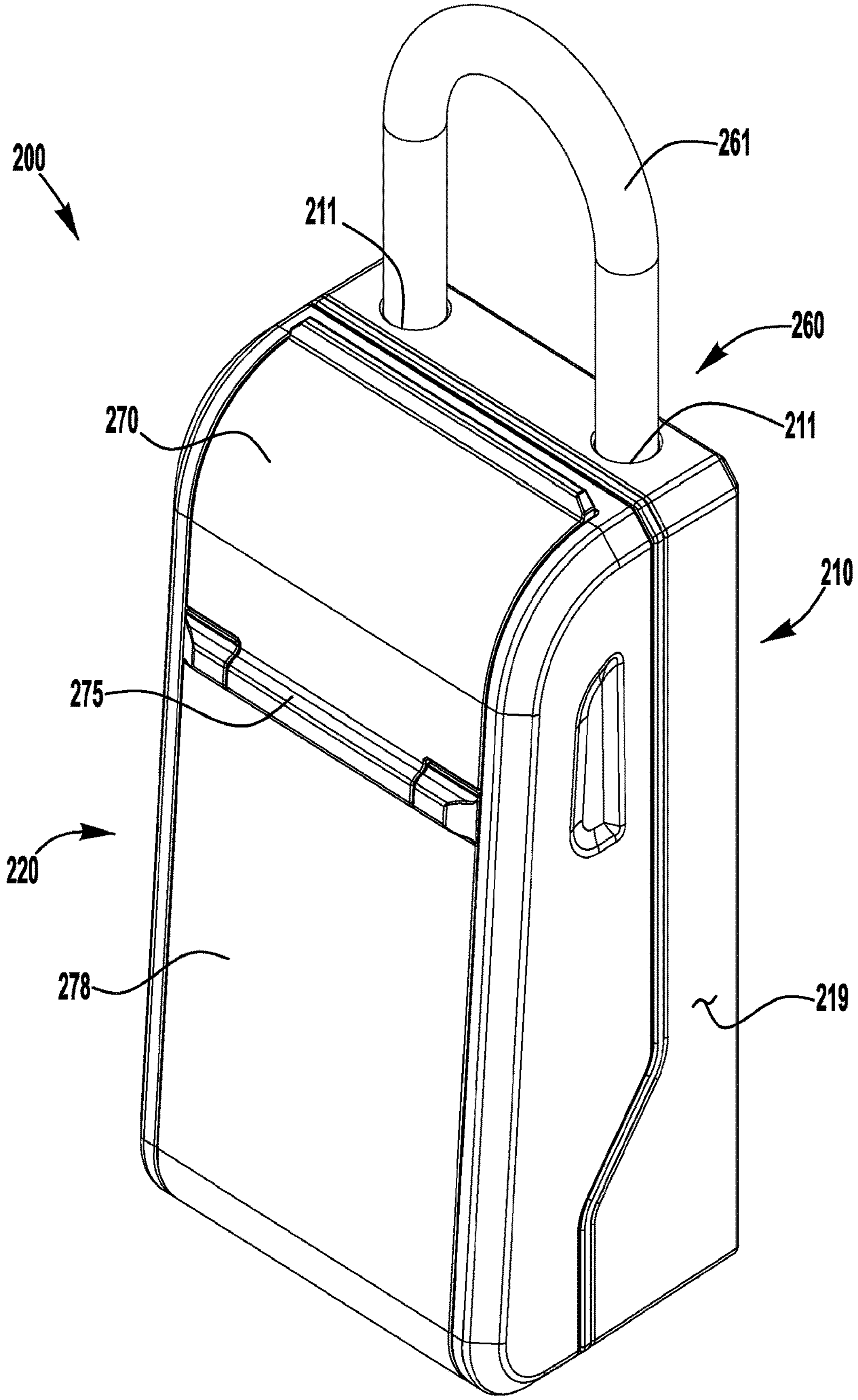
FIG. 8 is a front perspective view a lockbox in accordance with an exemplary embodiment of the present disclosure, shown in a closed condition.
Figure 9:
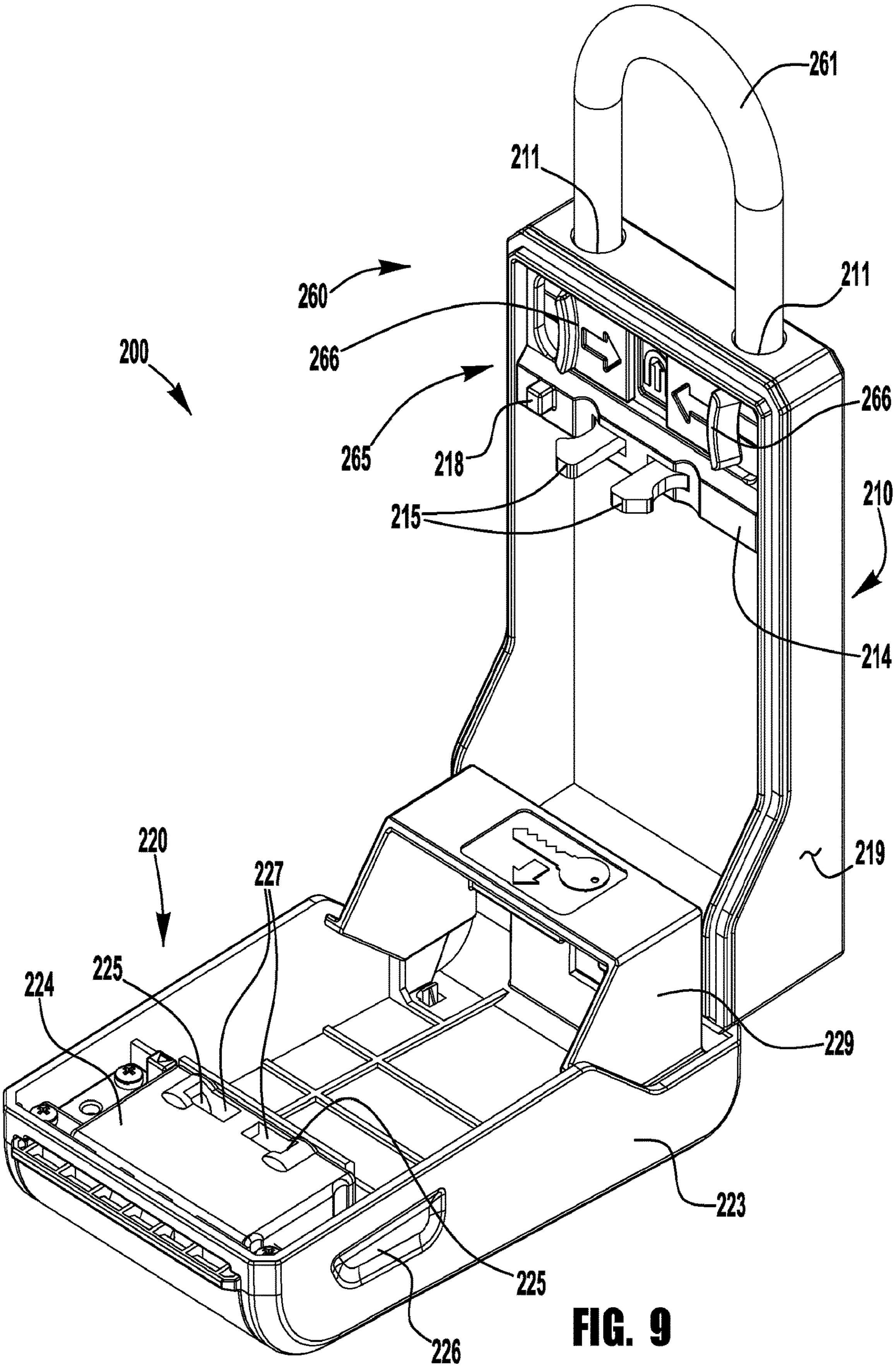
FIG. 9 is a front perspective view of the lockbox of FIG. 8, shown in an open condition.
Figure 10:
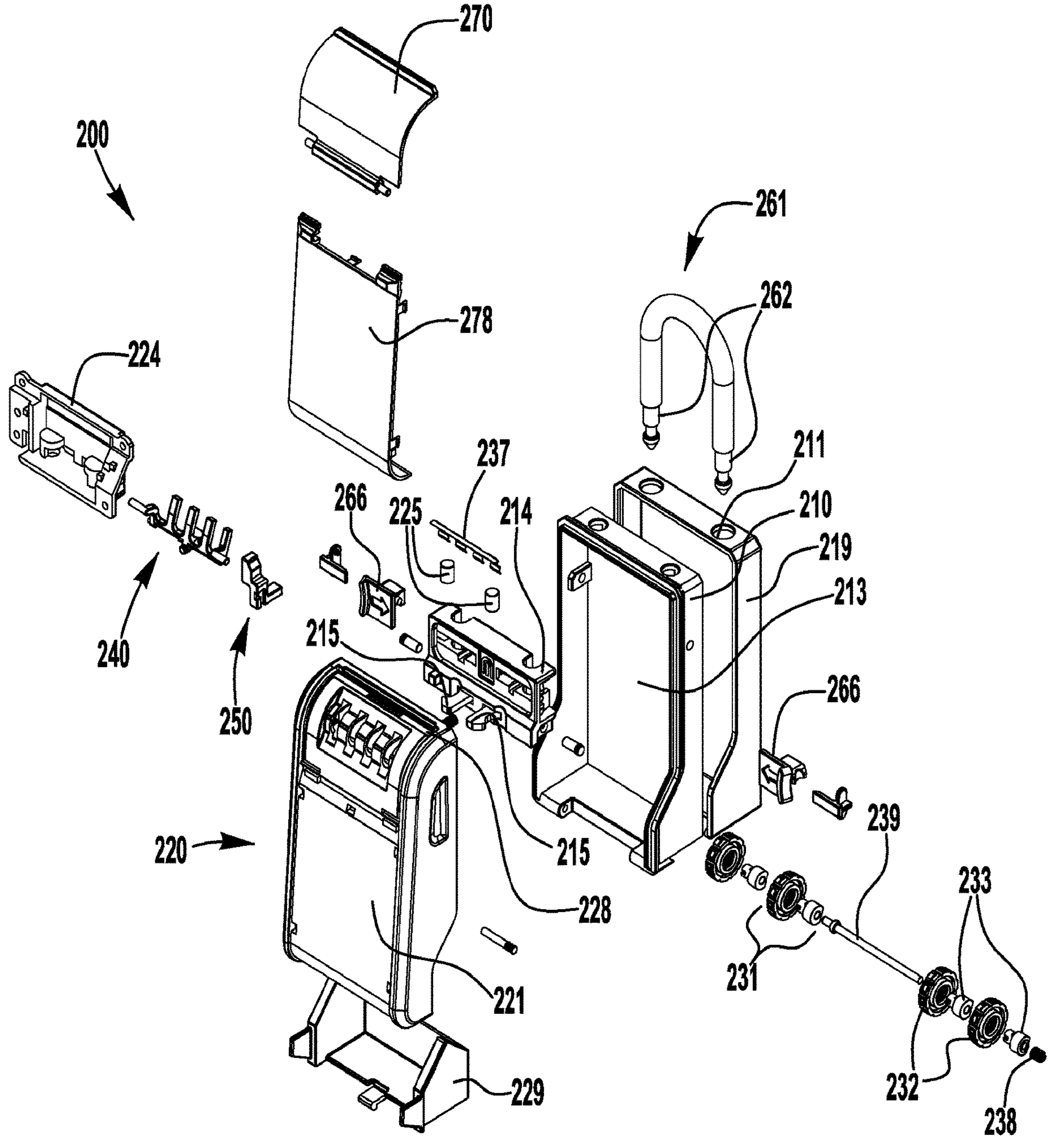
FIG. 10 is an exploded perspective view of the lockbox of FIG. 8.
Figure 11:
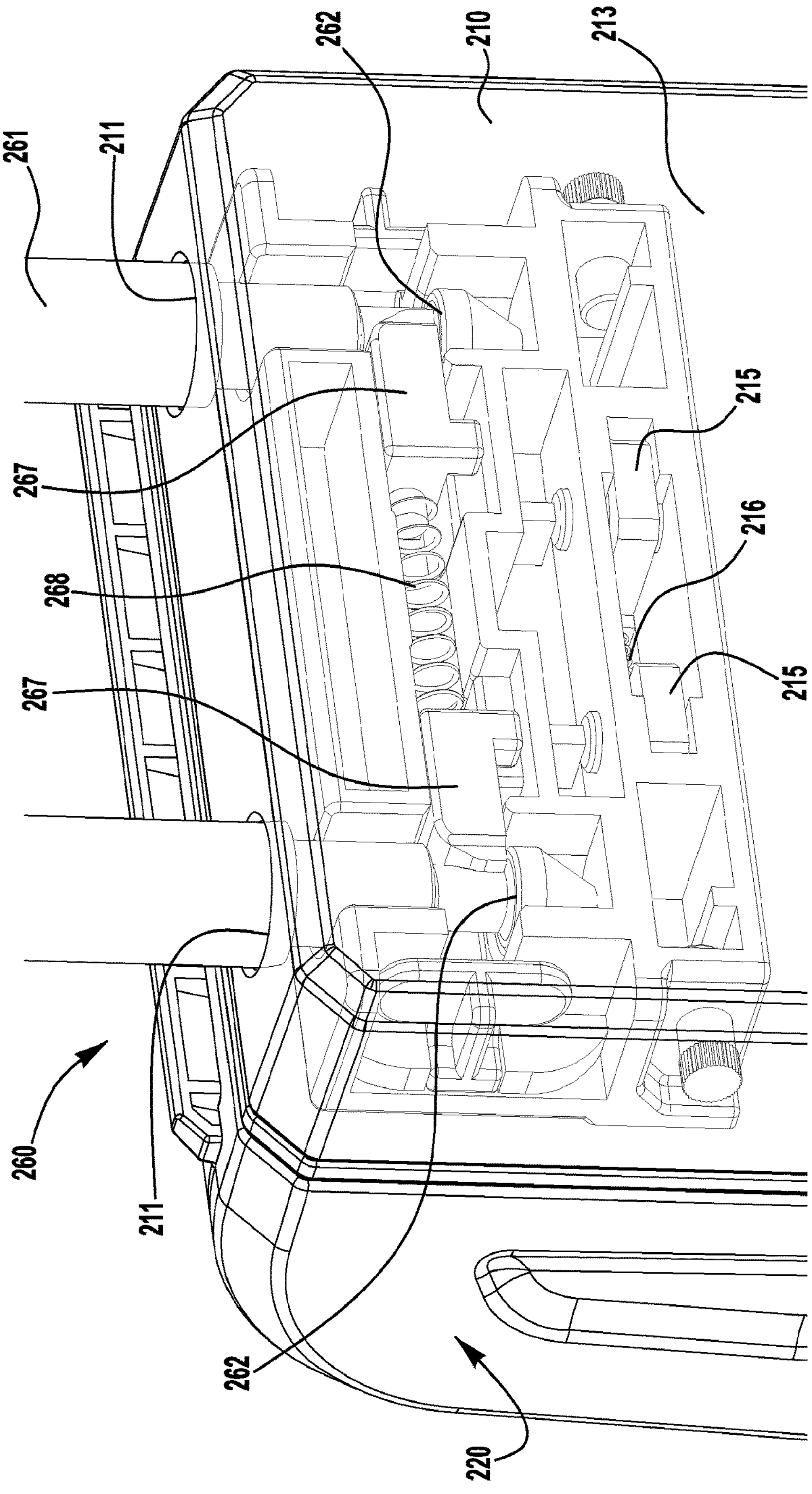
FIG. 11 is a rear perspective view of an upper portion of the housing of the lockbox of FIG. 8, with the rear wall portion of the housing shown in phantom to illustrate additional features of the lockbox.

In the illustrated embodiment, as best shown in the top cross sectional views of FIGS. 6A and 6B, the housing 110 includes movable latch members 115 extending from a rear wall portion 113 of the housing, and secured to the rear wall portion by pins 115*a* assembled with (e.g., enclosed within or staked through) a latch shroud 114 (e.g., bracket or enclosure) mounted to the housing rear wall portion, and the access door 120 includes a locking mechanism 130 and a latch engaging staple portion 125, each secured with a rear surface of a wall portion 121 of the access door 120, for example, by a lock shroud 124 (e.g., bracket or enclosure) mounted to the door wall portion, as shown.

In other embodiments, the latch members may be assembled with the access door and the staple portion may be secured with or carried by with the housing, and/or the locking mechanism may be assembled with the housing, as shown in the schematic embodiments of FIGS. 1B, 1C, and 1D, and described above.

When the access door 120 is in the closed position, the latch members 115 extend through apertures 127 in the lock shroud 124 to interlockingly engage the staple portion 125. In the illustrated embodiment, the staple portion 125 includes pins, posts, or roller-type staple elements 125-1, 125-2 secured with the lock shroud 124, and the latch members 115 include latch plates outwardly biased by a biasing spring 116 disposed between the housing rear wall 113 and the latch shroud 114.

The locking mechanism 130 includes a blocking element 140 having a blocking portion or extension 145 that is held in engagement with the latch members 115 (e.g., between the latch members, as shown) to secure the latch members in interlocking engagement with the staple portion 125 in a locked condition. The locking mechanism is operable to an unlocked condition in which the blocking element 140 is movable (e.g., pivotable, as shown) from a locking position to a releasing position to disengage the blocking extension 145 from the latch members 115, thereby permitting movement of the latch members 115 from the interlocking position to a releasing position out of engagement with the staple portion 125, for movement of the access door 120 from the closed position to the open position.

A variety of suitable locking mechanisms may be utilized including, for example, mechanical, electromechanical, and electromagnetic locking mechanisms having a variety of lock interfaces (e.g., single combination dial, multiple combination dials, mechanical pushbutton arrangements, or electronic keypad, wireless transceiver, or biometric operated arrangements). In the illustrated example, the locking mechanism 130 includes a series of combination dials 131 assembled with the access door 120, with user graspable portions of the combination dials protruding from or exposed through openings 122 in the front wall 121 of the access door 120 for user rotation of the dials. The dials are rotatable about a post 139 extending along a first axis A1. As shown, a spring detent plate 137 may be secured against the dials 131 to hold the dials in place against loose rotation in one of several set positions (for example, the numbered "0" through "9" positions on a conventional lock dial) when the dials are not being manually rotated by a user.

Each of the dials 131 includes an unlocking feature, such as, for example, a flat or recess 134, disposed on an outer periphery. When at least one of the dials is in a locking orientation (i.e., rotated out of an unlocking orientation), the at least one dial engages a corresponding dial contacting portion 144 of the blocking element 140 to prevent movement of the blocking element and disengagement of the blocking extension 145 from the latch members 115. In the illustrated embodiment, the dial contacting portions 144 form finger-like extensions on the blocking element 140, spaced apart to receive the dials 131 therebetween. The extensions 144 may be truncated to terminate at or just beyond the point of engagement with the dials 131, for example, to minimize the overall size of the locking mechanism, and/or to impede unauthorized access to or attacks of the blocking element (e.g. between adjoining door/housing edges or through the access door dial openings 122.

When the dials are each rotated to an unlocking orientation (as identifiable by the wheel indicia visible through the access door openings 122), the recesses 134 are aligned with the dial contacting portions 144 of the blocking element 140 to allow the blocking element 140 to be moved (e.g., by one or more biasing springs 146) from the locking position to the unlocked position. In the unlocked position, the blocking extension 145 is retracted or withdrawn from between the latch members 115, such that a pulling force applied to the access door 120 (e.g., by grasping recessed gripping portions 126 of door side walls 123) causes the staple portion 125 to force the latch members laterally inward (e.g., against biasing spring 116, as shown) and out of engagement with the staple portion, to permit movement of the access door 120 to the open position.

When the access door 120 is returned to the closed position, engagement of chamfered ends 117 of the latch members 115 with the staple portion 125 causes the latch members to move laterally inward (e.g., against biasing spring 116, as shown) and past the staple portion for spring biased reengagement with the staple portion when the access door is fully closed.

The locking mechanism 130 may be provided with a code change mechanism configured to allow an authorized user to change the unlocking combination code for the lockable enclosure. In the illustrated embodiment, the dials 131 include an indicia bearing portion or wheel 132 that is separable from a recess-defining portion or hub 133, for reorientation of the dial indicia with respect to the unlocking feature or recess of the dial. In the illustrated embodiment, each dial 131 includes a wheel 132 that engages a corresponding hub 133 on its inner diameter, for example, using interlocking teeth, for rotation of the wheel and hub together as a dial. The wheels 132 define an indicia-bearing outermost surface of the dials, protruding through the openings 122 in the housing 121 for user grasping and rotation, while the hubs 133 define the outer peripheral recesses 134 of each dial.

The wheels 132 are axially fixed with the access door wall 121 (by engagement with the openings 122), and the hubs 133 are axially fixed with the post 139. A code changing member 150 is assembled with the access door 120, between the door wall 121 and the lock shroud 124, and is slidable (e.g., by user movement of an exposed end tab portion 151 of the code changing member) to engage a camming surface 155 with an end portion of the post 139, for axial movement of the post and the hubs (against biasing spring 138) from a wheel engaging first axial position in which the hubs engage the wheels for rotation therewith, and a wheel disengaged second axial position in which the hubs are disengaged from the wheels to permit rotation of the wheels with respect to the hubs for reorientation of the dial indicia of the wheels with respect to the unlocking recesses of the hubs. The blocking element 140 includes a projection 142 received in a slot 152 in the code changing member 150 that blocks user movement of the code changing member when the blocking element is in the locking position, and that permits user movement of the set lever when the blocking element is in the unlocked position.

Upon disengagement of the hubs 133 from the wheels 132, one or more of the wheels may be rotated to new unlocking orientations to establish a new authorized combination. Once the new combination has been set, the code changing member 150 may be returned to the original, code maintaining position (by user movement of the end tab portion 151), and the biasing spring 138 returns the post 139 and hubs 133 to the wheel engaging position, reengaging the hubs with the wheels 132. As shown, the rear wall portion 113 of the housing 110 may include a protrusion 118 positioned to interfere with the end tab portion 151 when the code change member 150 is in the code change position, thereby preventing the access door from fully closing in this code change condition, for example, to prevent inadvertent code changes.

In the embodiment of FIGS. 2-7B, the lockbox housing 110 is mountable to a wall, entry door, or other structure by mounting fasteners installed through mounting holes 113*a* in the rear wall portion 113 of the housing. In other embodiments, other mounting arrangements may be used. FIGS. 8-11 illustrate a lockbox 200 similar to the lockbox 100 of FIGS. 2-7B (with like components numbered accordingly), but with a shackle arrangement 260 configured to releasably secure the lockbox 200 to a hasp, fence, doorknob, or other such external structure.

The shackle arrangement 260 includes a U-shaped shackle 261 having end portions 262 insertable into shackle holes 211 in the housing 210 for engagement with a shackle latch mechanism 265 secured with the housing and operable to releasably secure the shackle end portions with the housing. As shown, the shackle latch mechanism 265 may be retained with the housing by the latch shroud 214, which may be monolithically formed to secure the shackle latch mechanism and the latch members 215. In other embodiments (not shown), separate shroud elements may be provided for the shackle latch mechanism 265 and the latch members 215. The shackle latch mechanism 265 may include user operable levers 266, accessible only when the access door 220 is open, and movable to disengage shackle latches 267 (against biasing spring 268) from the shackle end portions 262 for removal of the shackle from the housing 210. The levers 266 and shackle latches 267 may be independently operable, for example, to facilitate use with a flexible shackle for which disengagement of only one shackle leg may be desired.

Other features and arrangements may additionally or alternatively be provided for a lockable enclosure or lockbox in accordance with the present application. For example, the lockbox 100, 200 may include a hinged cover 170, 270 to provide weatherproof protection for the combination dials. The hinged cover 170, 270 may be hingedly connected (at hinge portion 175, 275) with a front panel 178, 278 secured with the door wall portion 121, 221. The cover 170, 270 and front panel 178, 278 may be provided in a soft, durable material, such as, for example, a plastic or elastomeric material (e.g., a thermoplastic elastomer or TPE). The housing 110, 210 may similarly be provided with a soft (e.g., plastic or elastomeric) cover or bumper 119, 219, for example, to minimize or prevent damage to the entry door to which the enclosure 100, 200 is secured.

As another example, the access door wall 121, 221 may include a grooved upper perimeter 128, 228 providing egress for moisture and other contaminations to which the access door is exposed, thereby directing such contaminants away from the combination dials (or other lock interface).

As another example, the rear side of the access door 120, 220 may be provided with a tray, sleeve, cover or other such structure 129, 229 for retaining items to be stored in the lockbox 100, 200. This retention structure 129, 229 may be detachable (e.g., using a flexible tab and slot arrangement), for example, to replace with a different retention structure. The retention structure may provide the user with assurance that the inserted item will fit in the lockbox before attempting to close the access door.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

We claim:

1. A lockbox comprising:

a lockbox housing;

an access door assembled with the lockbox housing and movable between a closed position in which a perimeter edge portion of the access door adjoins a perimeter edge portion of the lockbox housing to block access to a cavity defined by the lockbox housing and the access door, and an open position permitting access to the cavity;

a staple portion carried by one of the access door and the lockbox housing, spaced apart from the perimeter edge portion of the one of the access door and the lockbox housing;

at least one latch member assembled with the other of the access door and the lockbox housing, spaced apart from the perimeter edge portion of the other of the access door and the lockbox housing, wherein when the access door is in the closed position, the at least one latch member is movable between an interlocking position in interlocking engagement with the staple portion and a releasing position disengaged from the staple portion to permit movement of the access door from the closed position to the open position; and a locking mechanism including a blocking element and a lock interface operable to move the blocking element from a locking position in which the blocking element engages the at least one latch member to prevent movement of the at least one latch member to the releasing position, to an unlocked position in which the blocking element is disengaged from the at least one latch member to permit movement of the at least one latch member to the releasing position.

2. The lockbox of claim 1, wherein the at least one latch member comprises a pivotable latch member.

3. The lockbox of claim 1, wherein the staple portion comprises first and second staple elements and the at least one latch member comprises first and second latch members.

4. The lockbox of claim 3, wherein when the blocking element is in the locking position, a portion of the blocking element is disposed between the first and second latch members to prevent inward lateral movement of the first and second latch members from the interlocking position to the releasing position.

5. The lockbox of claim 1, wherein the lock interface includes a plurality of dials configured to permit movement of the blocking element from the locking position to the unlocked position when each of the plurality of dials is rotated to an unlocking orientation.

6. The lockbox of claim 5, wherein when each of the plurality of dials is rotated to the unlocking orientation, an outer peripheral recess on each of the dials aligns with a dial engaging portion of the blocking element, allowing the blocking element to move from the locking position to the unlocked position, with each of the dial engaging portions being received in a corresponding one of the recesses.

7. The lockbox of claim 1, wherein the locking mechanism is assembled with the access door.

8. The lockbox of claim 1, wherein the at least one latch member is assembled with the lockbox housing and the staple portion is carried by the access door.

9. The lockbox of claim 1, further comprising a lock shroud affixed to the one of the access door and the lockbox housing and enclosing the staple portion, the lock shroud including an aperture receiving an end portion of the at least one latch member therethrough to enclose the interlocking engagement between the at least one latch member and the staple portion.

10. The lockbox of claim 9, wherein the blocking element is disposed within the lock shroud, such that engagement between the blocking element and the at least one latch member is enclosed by the lock shroud.

11. The lockbox of claim 1, further comprising a latch shroud affixed to the other of the access door and the lockbox housing and enclosing a base portion of the at least one latch member connected with the other of the access door and the lockbox housing, with an end portion of the at least one latch member extending through an aperture in the latch shroud for interlocking engagement with the staple portion.

12. The lockbox of claim 1, further comprising a shackle including first and second end portions extending through first and second shackle holes in the lockbox housing, and a shackle latch mechanism disposed within the lockbox housing and releasably engaged with the first and second shackle end portions to secure the shackle with the lockbox housing.

13. The lockbox of claim 12, wherein the shackle latch mechanism includes first and second shackle latches releasably engaged with the first and second shackle end portions.

14. The lockbox of claim 13, wherein the shackle latch mechanism includes first and second release levers independently operable for independent disengagement of the first and second shackle latches from the first and second shackle end portions.

15. The lockbox of claim 13, further comprising a latch shroud affixed to the lockbox housing and enclosing the first and second shackle latches.

16. The lockbox of claim 1, wherein the at least one latch member is spring biased toward the interlocking position.

17. The lockbox of claim 1, wherein the blocking element is spring biased toward the unlocked position.

18. The lockbox of claim 1, wherein when the blocking element is in the unlocked position, a pulling force applied to the access door causes the staple portion to force the at least one latch member into the releasing position and out of engagement with the staple portion, to permit movement of the access door to the open position.

19. A lockbox comprising:

a lockbox housing;

an access door assembled with the lockbox housing and movable between a closed position in which a perimeter edge portion of the access door adjoins a perimeter edge portion of the lockbox housing to block access to a cavity defined by the lockbox housing and the access door, and an open position permitting access to the cavity;

a staple portion carried by the access door, spaced apart from the perimeter edge portion of the access door;

at least one latch member assembled with the lockbox housing, spaced apart from the perimeter edge portion of the lockbox housing, wherein when the access door is in the closed position, the at least one latch member is movable between an interlocking position in interlocking engagement with the staple portion and a releasing position disengaged from the staple portion to permit movement of the access door from the closed position to the open position;

a locking mechanism operable between a locking condition in which the at least one latch member is secured in the interlocking position, and an unlocked condition in which the at least one latch member is movable to the releasing position; and a lock shroud affixed to the access door and enclosing the staple portion, the lock shroud including an aperture receiving an end portion of the at least one latch member therethrough to enclose the interlocking engagement between the at least one latch member and the staple portion.

20. A lockbox comprising:

a lockbox housing;

an access door assembled with the lockbox housing and movable between a closed position in which a perimeter edge portion of the access door adjoins a perimeter edge portion of the lockbox housing to block access to a cavity defined by the lockbox housing and the access door, and an open position permitting access to the cavity;

a staple portion carried by one of the access door and the lockbox housing;

at least one latch member assembled with the other of the access door and the lockbox housing, wherein when the access door is in the closed position, the at least one latch member is movable between an interlocking position in interlocking engagement with the staple portion and a releasing position disengaged from the staple portion to permit movement of the access door from the closed position to the open position;

a locking mechanism operable between a locking condition in which the at least one latch member is secured in the interlocking position, and an unlocked condition in which the at least one latch member is movable to the releasing position;

a shackle including first and second end portions extending through first and second shackle holes in the lockbox housing; and a shackle latch mechanism disposed within the lockbox housing and releasably engaged with the first and second shackle end portions to secure the shackle with the lockbox housing;

wherein the shackle latch mechanism includes first and second shackle latches releasably engaged with the first and second shackle end portions, and first and second release levers independently operable for independent disengagement of the first and second shackle latches from the first and second shackle end portions.

* * * * *